United States Patent
Vorobyev et al.

(10) Patent No.: US 8,388,391 B1
(45) Date of Patent: Mar. 5, 2013

(54) SCREW CONVEYOR SHAPE PROPELLER

(76) Inventors: Vladimir Vorobyev, North Hollywood, CA (US); Anait Serobyan, North Hollywood, CA (US)

( * ) Notice: Subject to any disclaimer, the term of this patent is extended or adjusted under 35 U.S.C. 154(b) by 113 days.

(21) Appl. No.: 13/005,732

(22) Filed: Jan. 13, 2011

(51) Int. Cl.
  *B63H 1/26* (2006.01)
(52) U.S. Cl. .......................... 440/48; 244/65
(58) Field of Classification Search ............... 114/151; 440/48, 49, 50, 67, 47, 75, 79; 244/65, 68, 244/69; 415/60, 66, 72, 73, 75
See application file for complete search history.

(56) References Cited

U.S. PATENT DOCUMENTS

| | | |
|---|---|---|
| 3,070,061 A | 12/1962 | Rightmyer |
| 3,977,353 A | 8/1976 | Toyama |
| 4,816,697 A | 3/1989 | Nalbandyan et al. |
| 5,664,978 A * | 9/1997 | Howe ............................. 440/75 |
| 5,810,288 A | 9/1998 | Sager |
| 6,203,388 B1 | 3/2001 | Sinko et al. |
| D454,859 S | 3/2002 | Sadamitsu et al. |
| 6,431,926 B1 * | 8/2002 | Rosefsky ....................... 440/48 |
| 6,626,638 B2 | 9/2003 | Rosefsky |
| 6,725,797 B2 * | 4/2004 | Hilleman ..................... 114/151 |

* cited by examiner

*Primary Examiner* — Lars A Olson

(57) ABSTRACT

The present invention features a screw propeller system for use in a machine including a watercraft or an aircraft. The system features two or more screw propellers installed in the machine. Each screw propeller comprises an axle with a spiral blade disposed on the axle, and a tube hub. A differential and disc-brake device is operatively connected to each the first screw propeller and the second screw propeller. The differential and disc-brake device functions to steer the machine.

11 Claims, 4 Drawing Sheets

SCREW CONVEYOR SHAPE PROPELLER

FIELD OF THE INVENTION

The present invention is directed to a screw propeller. More particularly, the present invention is directed to a screw propeller system for use in a watercraft, an aircraft, or a power plant.

BACKGROUND OF THE INVENTION

The use of propellers is to provide jet propulsion employing the power of air or water flow to drive electric generator or for driving mechanical work (e.g., windmills). Types of propellers include spiral-shape propellers, wing-blade-type propellers. The present invention features a screw propeller system for use in a watercraft. The screw propeller system comprises two or more screw propellers, wherein the screw propellers comprise a tube hub and a spiral blade attached to the tube hub, wherein the screw propellers are disposed on the hull of the watercraft. In some embodiments, the screw propeller system is used in an aircraft or a power plant.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

SUMMARY

The present invention features a screw propeller system. In some embodiments, the system comprises a first screw propeller and a second screw propeller, each screw propeller comprising an axle with a spiral blade disposed on the axle, the axle and spiral blade are together enclosed in a tube hub. The screw propellers may be installed in a watercraft (e.g., wherein the first screw propeller and the second screw propeller are installed in the hull) or an aircraft. In some embodiments, the system further comprises a differential and disc-brake device operatively connected to each the first screw propeller and the second screw propeller, the differential and disc-brake device functions to steer the watercraft (or aircraft).

In some embodiments, the spiral blade is generally flat. In some embodiments, the tube hub is between about 1 to 2 feet in diameter. In some embodiments, the tube hub is between about 1 to 5 feet in length. In some embodiments, the tube hub is about a full length of the watercraft or aircraft. In some embodiments, the watercraft is a hydrofoil watercraft. In some embodiments, the first screw propeller and the second screw propeller are each open to allow air to enter. In some embodiments, the first screw propeller and the second screw propeller are each oriented such that the direction of wind is at a 45 degree angle with the axle.

DESCRIPTION OF PREFERRED EMBODIMENTS

Figure 1:
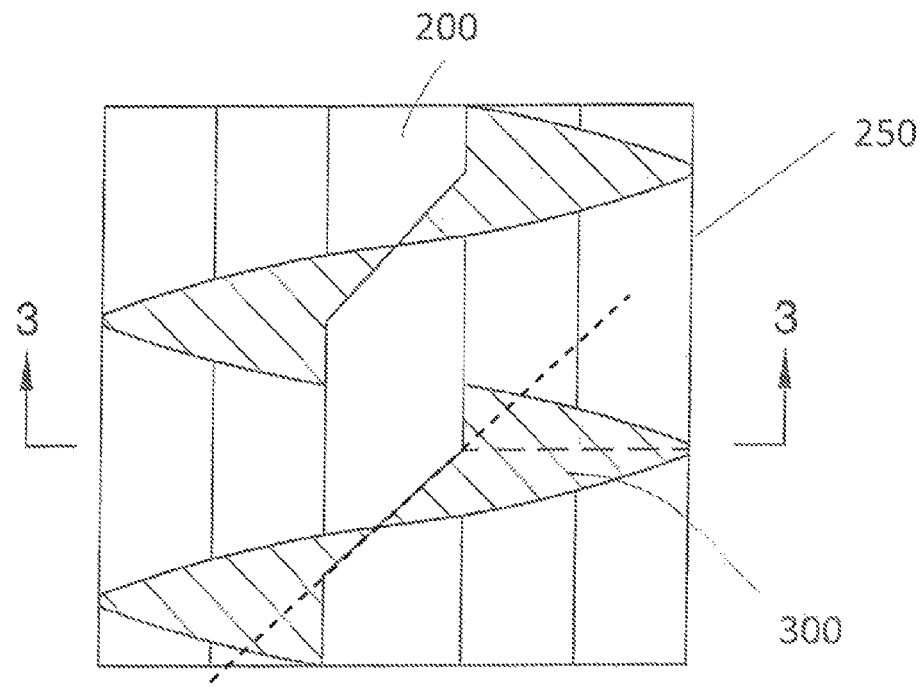
FIG. 1 is a first side cross sectional view of the screw propeller system of the present invention. As shown, the spiral blade 300 rises about 45 degrees along the axle 200.
Figure 2:
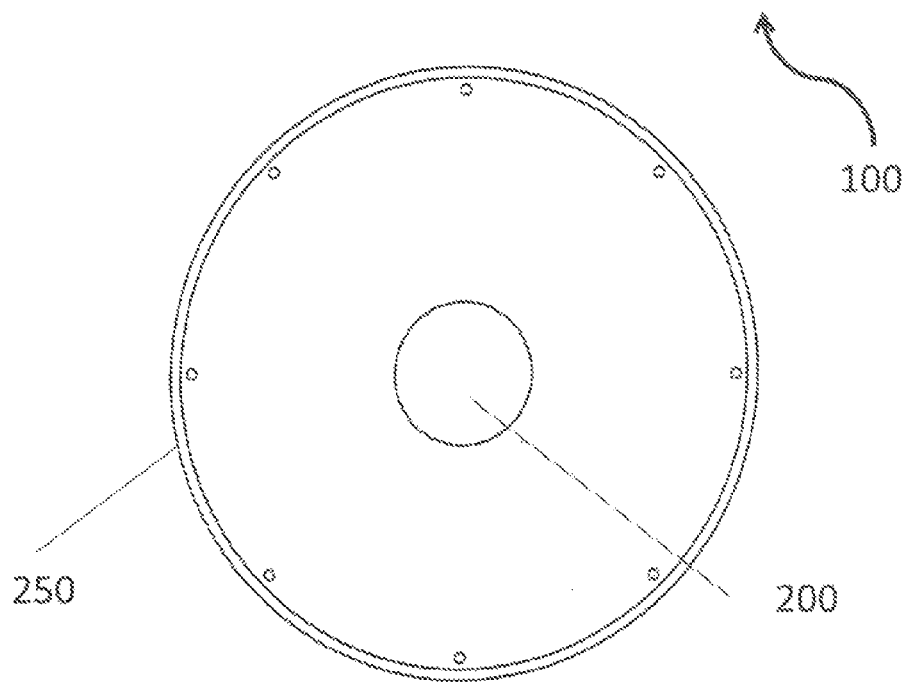
FIG. 2 is a bottom view of the screw propeller system of FIG. 1.
Figure 3:
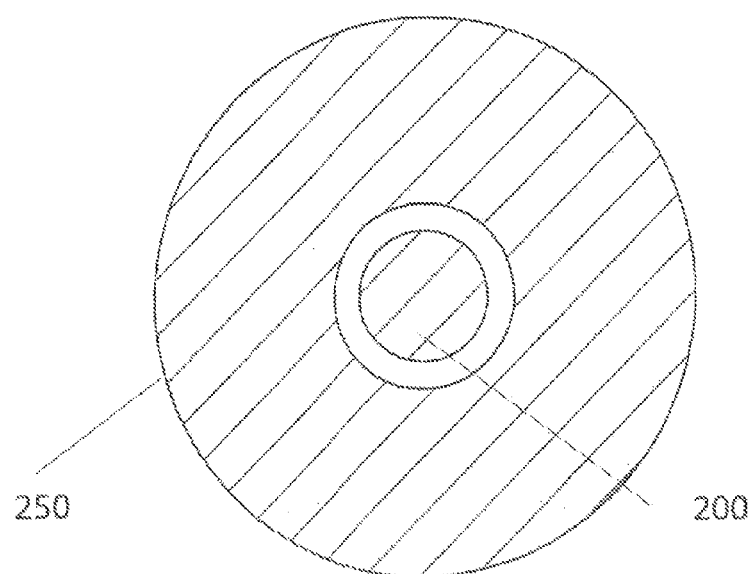
FIG. 3 is a top view of the screw propeller system of FIG. 1.
Figure 4:
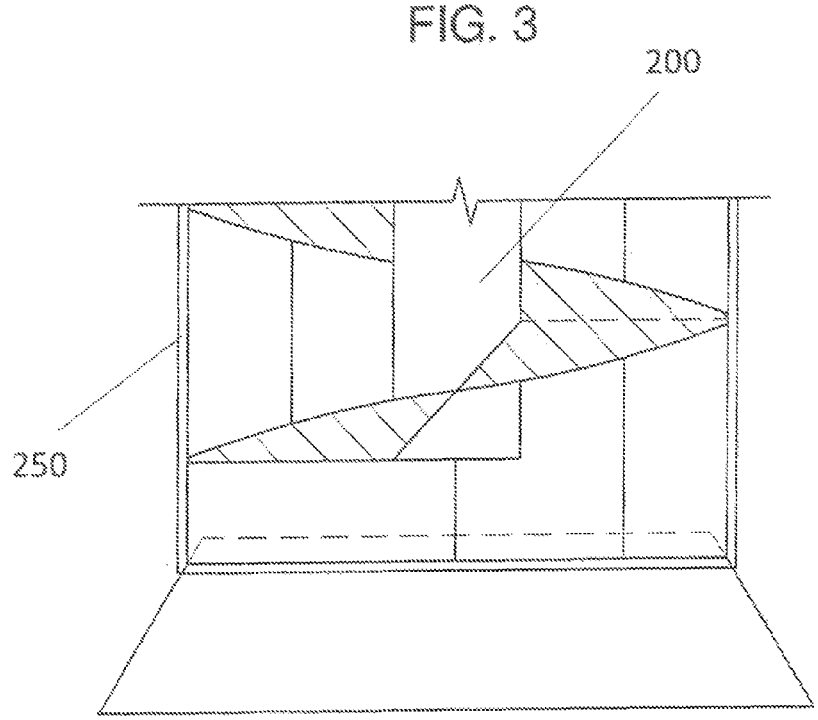
FIG. 4 is second side cross sectional view of the screw propeller system of the present invention.
Figure 5:
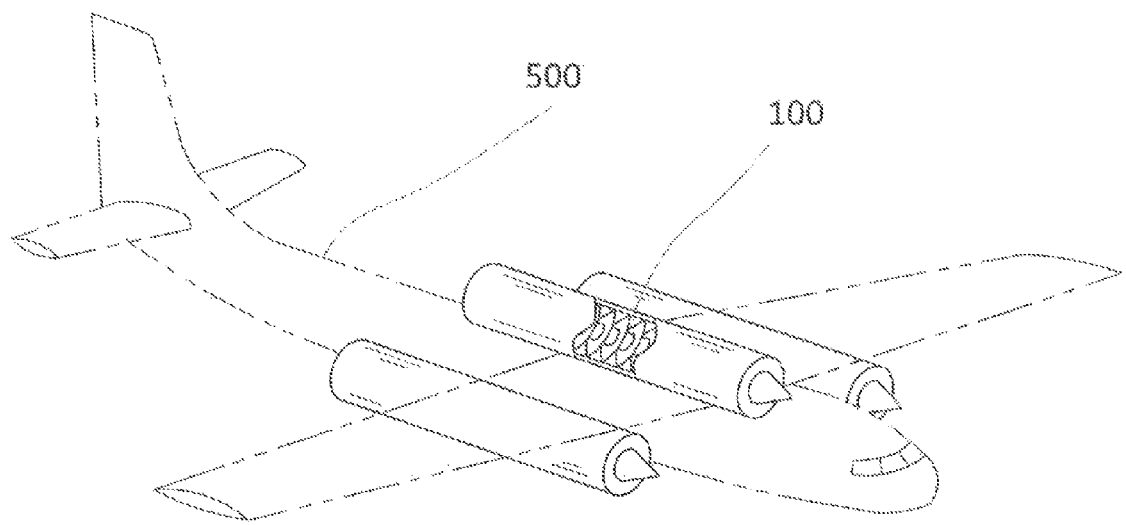
FIG. 5 is an in-use view of the screw propeller system as used in an aircraft.
Figure 6:
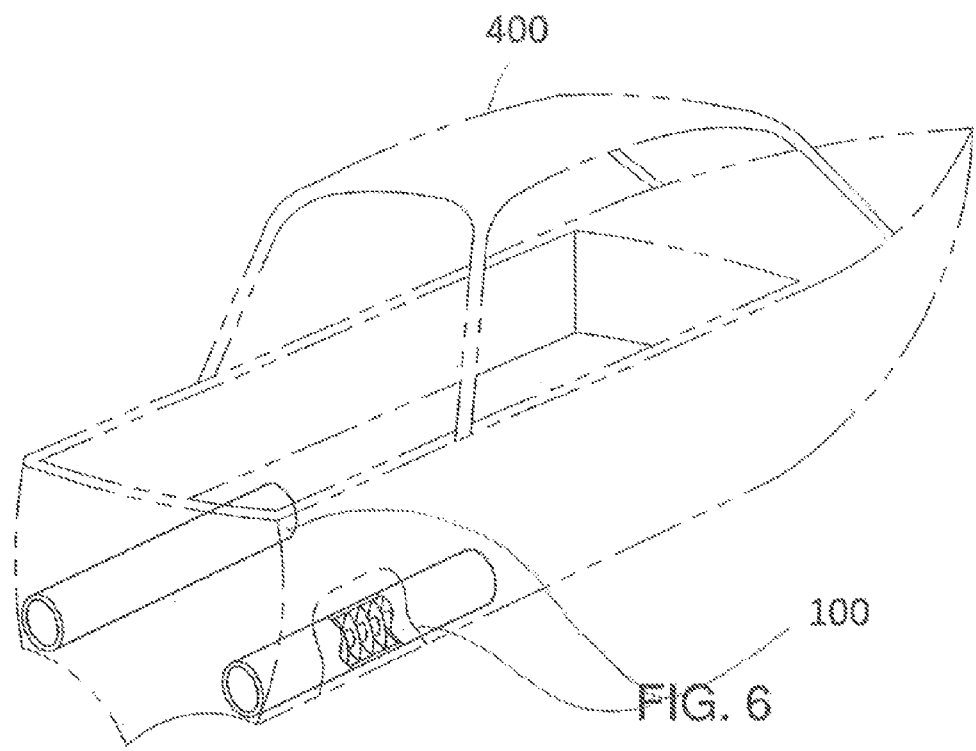
FIG. 6 is an in-use view of the screw propeller system as used in a watercraft.

Referring now to FIGS. 1-6, the present invention features a screw propeller system 100 for use in a watercraft. The screw propeller system 100 of the present invention may be designed as a propeller (e.g., looking liked a rotor of a screw-conveyor with a flat tape-shaped welded to the surface of the tube hub). This may be used for employing its long structure to utilize the full force of the wind flow at a 45 degree angle in relation to its rotation axle. Or, the system 100 may be designed as described (e.g., looking liked a rotor of a screw-conveyor with a flat tape-shaped welded to the surface of the tube hub) but with a surrounding security propulsion tube. This may enhance the ability to use the power of water flow efficiently.

Without wishing to limit the present invention to any theory or mechanism, it is believed that the length of the tube and the position of the propeller are important elements of the system 100 of the present invention. For example, they may increase water flow volume in the propeller tube, thus providing power and speed to a watercraft 400. Two propellers are used as propulsion and steering devices by using a differential and disc-brake device. Such differential and disc-brake devices are well known to one of ordinary skill in the art, for example such devices are used in automobiles. By braking one side of the system, the other one via a differential will continuously rotate, providing propulsion force. This makes steering easy without a second engine. Hence, in come embodiments, a machine may not need a rudder. In a watercraft, for example, the screw propeller systems may be dispose don the hull of the watercraft. The existence of two screw propeller systems on each side of the hull allows deflections in motion. Thus, the pace and the moving direction of a watercraft may be altered by the speed and rotation of the spinning propellers.

The screw propeller system 100 comprises two or more screw propellers (e.g., a first screw propeller, a second screw propeller) installed in a machine such as a watercraft 400 or an aircraft 500. The screw propellers each comprise an axle 200 with a spiral blade 300 disposed on the axle 200 (e.g., the spiral blade 300 is a helical blade). The axle 200 and spiral blade 300 are enclosed in a tube hub 250. The tube hubs 250 are disposed in the watercraft 400 or aircraft 500. In some embodiments, the spiral blade 300 is generally flat.

The system 100 of the present invention may be constructed in a variety of sizes. For example, in some embodiments, the screw propellers (e.g., the tube hubs 250) are about one half the length of the watercraft 400. In some embodiments, the tube hub 250 is between about 1 to 2 feet in diameter. In some embodiments, the tube hub 250 is between about 2 to 5 feet in diameter. In some embodiments, the tube hub 250 is more than about 5 feet in diameter. In some embodiments, the tube hub 250 is between about 1 to 5 feet in length. In some embodiments, the tube hub 250 is more than about 5 feet in length.

In some embodiments, drive of the watercraft is accomplished with a bevel gear assembly. Bevel gears are gears (typically with tooth-bearing faces) wherein the axels of two shafts intersect. In some embodiments, the bevel gear assembly is linked to two inward converging half-shafts. In some embodiments, the inward converging half-shafts are linked to an open differential. In some embodiments, an input shaft may be connected to the output shaft of the watercraft's engine.

In some embodiments, the watercraft does not feature a traditional rudder. In some embodiments, differential steering is employed. In some embodiments, differential steering is accomplished via a disc brake. In some embodiments, a brake is disposed on each located on one or more half-shafts.

In some embodiments, the watercraft is a hydrofoil watercraft 400. A hydrofoil is a boat with wing-like foils mounted on struts below the hull. As the watercraft increases its speed, the hydrofoils develop enough lift for the boat to become foilborne (e.g., raise the hull up and out of the water). In some embodiments, the screw propellers are about the full length of the watercraft. In some embodiments, the screw propellers are disposed on the lower ends of downward extending struts. In some embodiments, cross members are in the form of hydrofoils, wherein the cross members are designed to generate sufficient lift to raise the watercraft out of the water (and thereby reduce drag at sufficiently high speeds).

In some embodiments, the screw propeller system of the present invention may be used in a variety of applications. For example, the screw conveyor propeller may be used in an aircraft 500, a wind generator, or a power plant (e.g., a hydroelectric power plant, a nuclear power plant, a draft heat-based power plant).

In some embodiments, the screw propeller is open. In some embodiments, the screw propeller is open for utilizing the force of wind. In some embodiments, the screw conveyors are oriented such that the direction of the wind is at a 45 degree angle with the rotation axle.

Without wishing to limit the present invention to any theory or mechanism, it is believed that the screw conveyor propeller of the present invention may eliminate a need for a rudder or a pivoting driveline and may eliminate torque effects. In addition, the screw conveyor propeller of the present invention may possess greater physical strength and greater resistance to damage as compared to screw propellers currently in use in watercrafts In some embodiments, the screw propeller is constructed from a material comprising stainless steel, duralumin, metal alloy, the like, or a combination thereof. In some embodiments, the screw propeller is constructed from a corrosion-resistant material.

As used herein, the term "about" refers to plus or minus 10% of the referenced number. For example, an embodiment wherein the tube hub 250 is about 2 feet in diameter includes a tube hub 250 that is between 1.8 and 2.2 feet in diameter.

The disclosures of the following U.S. patents are incorporated in their entirety by reference herein: U.S. Pat. No. 3,070,061; U.S. Pat. No. 4,816,697; U.S. Design Pat. No. D454,859; U.S. Pat. No. 3,977,353; U.S. Pat. No. 6,626,638; U.S. Pat. No. 6,203,388; U.S. Pat. No. 5,810,288.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. A screw propeller system consisting of:
    (a) a first screw propeller and a second screw propeller, each screw propeller consisting an axle with a spiral blade disposed on the axle, the axle and spiral blade are together enclosed in a tube hub,
    wherein the blade is flat;
    wherein the spiral blade rises at a 45 degree angle on the axle uniformly throughout the entire axle;
    (b) a watercraft, wherein the first screw propeller and the second screw propeller are installed in a hull of the watercraft; and
    (c) a differential and disc-brake device operatively connected to each the first screw propeller and the second screw propeller, the differential and disc-brake device functions to steer the watercraft.

2. The system of claim 1, wherein the tube hub is between about 1 to 2 feet in diameter.

3. The system of claim 1, wherein the tube hub is between about 1 to 5 feet in length.

4. The system of claim 1, wherein the tube hub is about a full length of the watercraft.

5. The system of claim 1, wherein the watercraft is a hydrofoil watercraft.

6. A screw propeller system consisting of:
    (a) a first screw propeller and a second screw propeller, each screw propeller consisting an axle with a spiral blade disposed on the axle, the axle and spiral blade are together enclosed in a tube hub; wherein the blade is flat, wherein the first screw propeller and the second screw propeller are each oriented such that the direction of wind is at a 45 degree angle with the axle; and
    (b) an aircraft, wherein the first screw propeller and the second screw propeller are installed in the aircraft.

7. The system of claim 6 further consisting of a differential and disc-brake device operatively connected to each the first screw propeller and the second screw propeller, the differential and disc-brake device function to steer the aircraft.

8. The system of claim 6, wherein the spiral blade is generally flat.

9. The system of claim 6, wherein the tube hub is between about 1 to 2 feet in diameter.

10. The system of claim 6, wherein the tube hub is between about 1 to 5 feet in length.

11. The system of claim 6, wherein the first screw propeller and the second screw propeller are each open to allow air to enter.

* * * * *